United States Patent
Hirayama

(10) Patent No.: US 7,590,033 B2
(45) Date of Patent: Sep. 15, 2009

(54) OPTICAL DISC REPRODUCING APPARATUS

(75) Inventor: Masahiro Hirayama, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 488 days.

(21) Appl. No.: 11/433,504

(22) Filed: May 15, 2006

(65) Prior Publication Data
US 2006/0257100 A1 Nov. 16, 2006

(30) Foreign Application Priority Data
May 16, 2005 (JP) .............................. 2005-142349

(51) Int. Cl.
*G11B 27/00* (2006.01)
(52) U.S. Cl. .............. 369/30.26; 369/30.36; 369/47.11; 386/82; 386/95
(58) Field of Classification Search ........................ None
See application file for complete search history.

(56) References Cited

U.S. PATENT DOCUMENTS

2002/0078144 A1*  6/2002  Lamkin et al. .............. 709/203
2002/0174430 A1* 11/2002  Ellis et al. ...................... 725/46
2005/0276570 A1* 12/2005  Reed et al. ..................... 386/46
2007/0097799 A1*  5/2007  Ohizumi et al. .......... 369/30.04

FOREIGN PATENT DOCUMENTS

JP          60-50784       3/1985
JP         2004-164804     6/2004

* cited by examiner

*Primary Examiner*—Wayne R Young
*Assistant Examiner*—Brian Butcher
(74) *Attorney, Agent, or Firm*—Morgan Lewis & Bockius LLP

(57) ABSTRACT

In an optical disc reproducing apparatus, when a stop key is pressed during reproduction of an optical disc, a resume function is activated, and a resume-on indication appears on a display device. When the resume-on indication goes out a predetermined time thereafter, a resume-indicating light-emitting device is lit. Thereafter, when a play key is pressed, resume reproduction is started. If, by mistake, a key other than the play key is pressed, a warning indication appears on the display device to indicate that a resume-on state is currently established, and also, if the pressing of the key is a first-time pressing, the pressing of the key is neglected.

4 Claims, 4 Drawing Sheets

OPTICAL DISC REPRODUCING APPARATUS

This application is based on Japanese Patent Application No. 2005-142349 filed on May 16, 2005, the contents of which are hereby incorporated by reference.

BACKGROUND OF THE INVENTION

1. Field of the Invention

The present invention relates to an optical disc reproducing apparatus, such as a DVD (digital versatile disc) player, and more particularly to an optical disc reproducing apparatus having a resume function that allows, when restarting previously suspended reproduction, reproduction to be restarted from immediately after the reproduction position on an optical disc where reproduction has previously been suspended.

2. Description of Related Art

An optical disc reproducing apparatus has what is called a resume function that allows, when a play key is pressed after a stop key is pressed to stop reproduction during reproduction of information on an optical disc, reproduction to be restarted from immediately after the reproduction position on an optical disc where reproduction has previously been suspended.

More specifically, in a case where operations are carried out, for example, by using a remote control, after an optical disc is inserted into an optical disc reproducing apparatus, reproduction of information recorded on the optical disc is started by pressing a play key provided on the remote control. When a stop key provided on the remote control is pressed during reproduction, the resume function is activated and a resume-on indication appears on a display device to indicate that the resume function is on. A predetermined time after the resume-on indication started to be displayed, the resume-on indication goes out. Another predetermined time thereafter, the optical disc reproducing apparatus as a whole is turned off so as to save power.

Examples of an appliance having a resume function are disclosed in JP-A-2004-164804 and in JP-A-S60-50784.

In a case where, with an appliance having a resume function, resume reproduction is carried out after a resume-on indication appears and before the resume-on indication goes out, since the resume-on indication remains displayed on a display device, it is clear not only to the user who has left the apparatus in a resume-stop mode but also to other people that the optical disc reproducing apparatus is in a resume-stop mode and that resume reproduction will be started by pressing a play key on a remote control or the like.

By contrast, in a case where the resume-on indication has gone out or in a case where, a predetermined time thereafter, the optical disc reproducing apparatus as a whole has been turned off, the current mode of operation of the optical disc reproducing apparatus may be unclear.

For example, when the optical disc reproducing apparatus is stopped during an optical disc reproducing operation and is left in a resume-on state, the resume-on indication goes out with time, and then, the optical disc reproducing apparatus as a whole is turned off. In such a situation, even the user himself/herself who has stopped the optical disc reproducing apparatus may forget that the optical disc reproducing apparatus is in the resume-stop mode, let alone other people, who have no way of knowing the current mode of the optical disc reproducing apparatus when they start using it.

When the optical disc reproducing apparatus is operated with the current mode thereof unclear as described above, if the play key is pressed, resume reproduction starts; if a key other than the play key, such as a stop key or a menu key, is pressed, the resume-on state is cancelled and an operation according to the pressed key, instead of the intended resume reproduction, will be performed. This reduces the user-friendliness of the optical disc reproducing apparatus.

In the appliance described in JP-A-2004-164804, pressing the stop button during a reproducing operation establishes a resume stop mode, sending the mechanism into a stopping phase. During the stopping phase, another pressing of the stop button is not accepted, and an invalid operation indication is displayed. It is not disclosed, however, how the appliance operates in a case where a resume-stop indication (a resume-on indication), which is displayed when the appliance is in the resume-stop mode, goes out a predetermined time thereafter.

The appliance described in JP-A-S60-50784 is a DAD (digital audio disc) player, which is different from an optical disc reproducing apparatus such as a DVD player in which a reproduced image, a resume-on sign, and the like are displayed on a display device.

SUMMARY OF THE INVENTION

The present invention has been made to solve the conventionally encountered problems discussed above, and it is an object of the present invention to provide an optical disc reproducing apparatus that clearly indicates that it is in a resume-on state when it is and that does not cancel the resume-on state even when a key other than a start key is inadvertently pressed to start resume reproduction.

To achieve the above described object, according to the present invention, an optical disc reproducing apparatus has a resume function that allows, when reproduction is suspended and then restarted, reproduction to be restarted from immediately after the reproduction position on an optical disc where reproduction has previously been suspended. Here, a system controller of the optical disc reproducing apparatus controls in such a way that: when the resume function is activated and a resume-on state is established, the system controller makes a display device display a resume-on sign to show that the resume-on state is established; when the resume-on sign goes out a predetermined time thereafter, the system controller lights a resume-indicating light-emitting device; and if a key other than a play key is pressed for a first time while the resume-on indication is displayed, the system controller ignores the first pressing of the key.

With this configuration, even if the resume-on sign goes out, the optical disc reproducing apparatus can clearly indicate that it is in the resume-on state by lighting the resume-indicating light-emitting device. This helps avoid such a situation where, as a result of leaving an optical disc reproducing apparatus in a resume-on state, it is unclear whether or not a resume-on state is established. Furthermore, even if the user inadvertently presses a key other than the play key for a first time trying to start resume reproduction, or even if another person unknowingly presses a key other than the play key for a first time, the first pressing of the key is ignored, and thus the resume-on state is not cancelled. This makes it possible to make good use of the resume function.

Moreover, according to the present invention, in the optical disc reproducing apparatus configured as described above, the system controller is provided with: stop key pressing detecting means for detecting whether or not the stop key is pressed during reproduction of information on an optical disc; resume function activating means for activating the resume function to establish a resume-on state when the stop key pressing detecting means finds the stop key to have been pressed; resume-on indicating means for making the display device display a resume-on sign to show that the resume-on state is established when the resume-on state is established;

resume-on indication checking means for checking whether or not the resume-on sign has gone out a predetermined time thereafter; light-emitting-device lighting means for turning on a resume-indicating light-emitting device when the resume-on indication checking means finds the resume-on sign to have gone out; key-press counting means for checking whether a key other than the play key, when pressed while the resume-on sign is displayed or the resume-indicating light-emitting device is on, is pressed for a first time or for a second or later time; key operation neglecting means for making the display device show and warn that a resume-on state is established and for neglecting pressing of a key other than the play key if the key is pressed for a first time; and regular key operation means for permitting, if a key other than the play key is pressed for a second or later time, a regular operation to be performed according to the key pressed.

With this configuration, the system controller can achieve: detection of whether or not the stop key is pressed; activation of the resume function; resume-on indication; checking of the resume-on sign; turning on of the light-emitting device; checking of pressing of a key; neglecting of pressing of a key; and operation according to a key pressed. Thus, by turning on a resume-indicating light-emitting device, it can be clearly indicated that a resume-on state is established, even if a resume-on sign on the display device has gone out. Moreover, in an attempt to start resume reproduction, even if a key other than the play key is inadvertently pressed, an indication to warn that a resume-on state is established helps make the mistake known. Pressing of a key other than the play key for a first time is neglected, and thus the resume-on state is not cancelled.

According to the present invention, in the optical disc reproducing apparatus configured as described above, when a power ON/OFF indicating light-emitting device of the optical disc reproducing apparatus is used as the resume-indicating light-emitting device, the system controller uses, as the light-emitting-device lighting means, light-emitting-device blinking means that blinks the power ON/OFF indicating light-emitting device such that: when power is on, the power ON/OFF indicating light-emitting device blinks in a color in which the power ON/OFF indicating light-emitting device is lit when the power is on; when the power is off, the power ON/OFF indicating light-emitting device blinks in a color in which the power ON/OFF indicating light-emitting device is lit when the power is off.

With this configuration, when the power ON/OFF indicating light-emitting device of the optical disc reproducing apparatus is used as the resume-indicating light-emitting device, the system controller blinks the power ON/OFF indicating light-emitting device such that: when the power is on, the power ON/OFF indicating light-emitting device blinks in a color in which the power ON/OFF indicating light-emitting device is lit when the power is on; when the power is off, the power ON/OFF indicating light-emitting device blinks in a color in which the power ON/OFF indicating light-emitting device is lit when the power is off. This enables the user to clearly know that the power of the optical disc reproducing apparatus is on or that a resume-on state is established with the power off.

BRIEF DESCRIPTION OF THE DRAWINGS

These and other objects and features of the present invention will be apparent from the following detailed description of preferred embodiments thereof taken in conjunction with the accompanying drawings, in which.

DETAILED DESCRIPTION OF PREFERRED EMBODIMENTS

Figure 1:
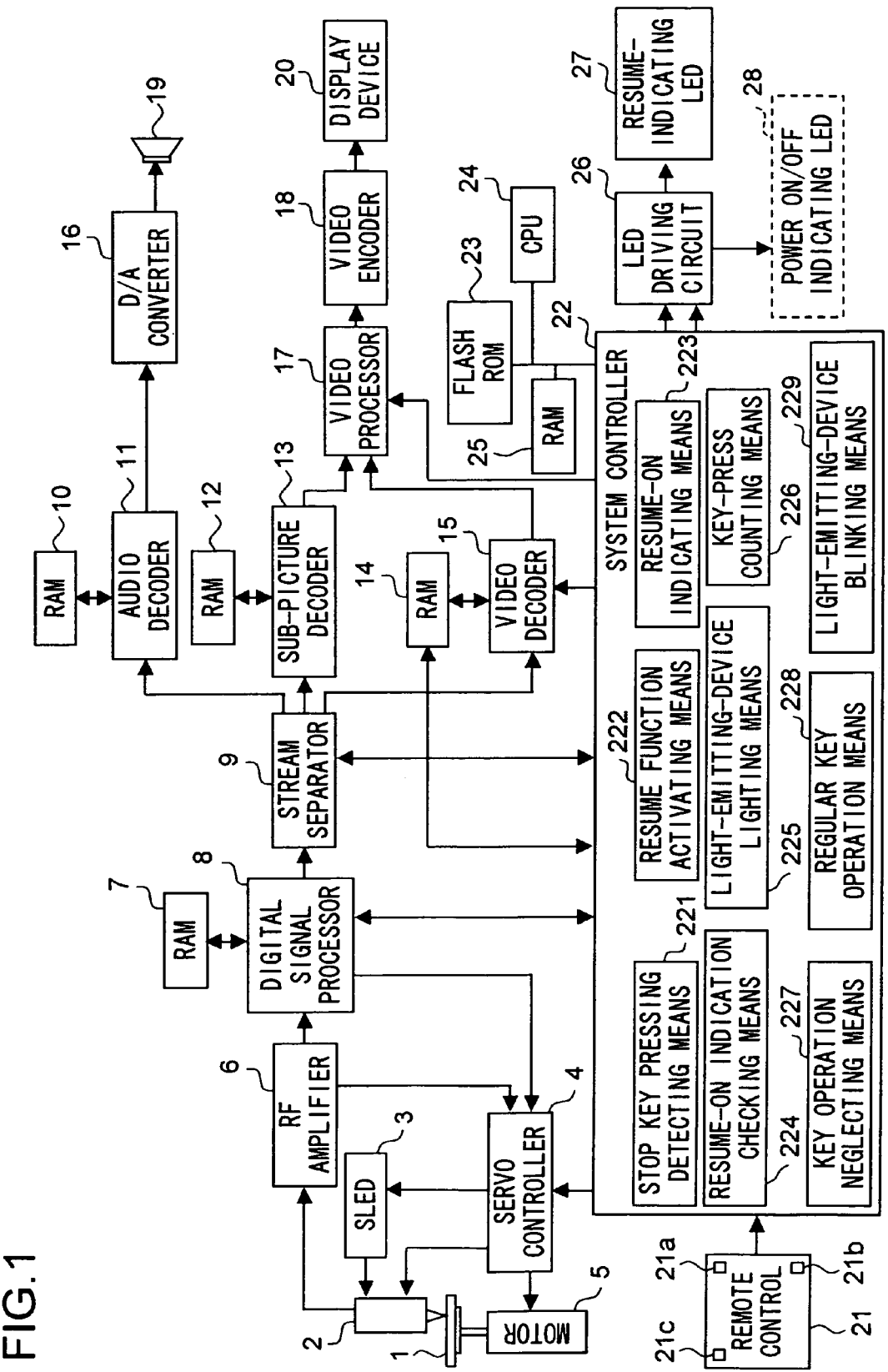
FIG. 1 is a block diagram showing the configuration of an optical disc reproducing apparatus embodying the present invention.

Hereinafter, the best mode of carrying out the present invention will be described in detail by way of embodiments shown in FIGS. 1 to 4. It should be understood, however, that these embodiments are simply meant to exemplify an optical disc reproducing apparatus that embodies the technical idea of the present invention and are therefore not meant to limit in any way the manner in which the present invention is carried out; the present invention admits many modifications and variations within the scope of the claimed technical idea.

An optical disc reproducing apparatus according to the present invention is provided with: a spindle motor 5 that turns an optical disc 1; an optical pickup 2 that emits laser light for reproducing information recorded on the optical disc 1 and that receives light reflected from the optical disc 1; a sled 3 that moves the optical pickup 2 in a radial direction of the optical disc 1; and a servo controller 4 that drives the spindle motor 5 and the sled 1 according to instructions from a system controller 22 and moves a focal position of the laser light in perpendicular and parallel directions with respect to a recording surface of the optical disc 1 by moving an objective lens (not shown) incorporated in the optical pickup 2.

The optical disc reproducing apparatus is further provided with: an RF amplifier 6 that, when the optical disc 1 is reproduced, amplifies an RF signal fed, as a readout signal, from the optical pickup 2; a digital signal processor 8 that converts the RF signal outputted from the RF amplifier 6 into digital data, then performs signal demodulation and error correction according to the data format of the optical disc 1, and then stores the resulting data in a RAM 7; and a stream separator 9 that, according to instructions from the system controller 22, separates audio data complying with the DVD-audio standard, sub-picture data, and video data from the data stream outputted from the digital signal processor 8.

The optical disc reproducing apparatus is further provided with: an audio decoder 11 to which is inputted the audio data outputted from the stream separator 9 and that performs predetermined decoding; a RAM 10 that temporarily stores data for the audio decoder 11 to perform decoding; a sub-picture decoder 13 to which is inputted the sub-picture data outputted from the stream separator 9 and that performs predetermined decoding; a RAM 12 that temporarily stores data for the sub-picture decoder 13 to perform decoding; a video decoder 15 to which is inputted the video data outputted from the stream separator 9 and that performs predetermined decoding; and a RAM 14 that temporarily stores data for the video decoder 15 to perform decoding.

The optical disc reproducing apparatus is further provided with: a video processor 17 that, according to instructions from the system controller 22, synthesizes the data outputted from the video decoder 15 and the data outputted from the sub-picture decoder 13; a video encoder 18 that converts the synthesized data outputted from the video processor 17 into a display video signal so as to permit a display device 20 to display an image; and a D/A converter that converts the data outputted from the audio decoder 11 into an analogue audio signal and then feeds it to a speaker 19.

The optical disc reproducing apparatus is further provided with: a system controller 22 that controls the whole apparatus; and a remote control 21 having various operation keys such as a play key 21a for giving a reproducing instruction to the system controller 22, a stop key 21b for giving a stopping instruction to the system controller 22, and a power key 21c. The optical disc reproducing apparatus is also provided with: a flash ROM 23 that stores programs and data for controlling the individual components of the apparatus and the apparatus as a whole; a CPU 24 that performs computation according to the programs and data stored in the flash ROM 23, thereby controlling the system controller 22; and a RAM 25 that temporarily stores data necessary for the computation performed by the CPU 24.

The system controller 22 is provided with: stop key pressing detecting means 221 for detecting whether or not the stop key 21b is pressed during reproduction of information on an optical disc; resume function activating means 222 for establishing a resume-on state when the stop key pressing detecting means 221 finds the stop key 21b to have been pressed; resume-on indicating means 223 for making the display device display a resume-on indication when the resume-on state is established; resume-on indication checking means 224 for checking whether or not the resume-on indication has gone out a predetermined time thereafter; light-emitting-device lighting means 225 for making, when the resume-on indication checking means 224 finds the resume-on indication to have gone out, an LED driving circuit 26 light a resume-indicating LED 27 used as a resume-indicating device.

The system controller 22 is further provided with: key-press counting means 226 for checking whether a key other than the play key, when pressed while the resume-on indication is displayed or the light-emitting device for the resume indication is on, is pressed for a first time or for a second or later time; key operation neglecting means 227 for making the display device 20 indicate and warn that the resume-on state is established and for neglecting pressing of a key other than the play key if the key is pressed for a first time; regular key operation means 228 for permitting, if a key other than the play key is pressed for a second or later time, a regular operation to be performed according to the key pressed.

As a resume-indicating light-emitting device, a power ON/OFF indicating LED 28 for indicating the power ON/OFF status of the whole apparatus may be used. In this case, there is no need to provide another resume-indicating LED 27.

When the power ON/OFF indicating LED 28 is used as the resume-indicating light-emitting device, light-emitting-device blinking means 229 may be used instead of the light-emitting-device lighting means 225 so as to control the power ON/OFF indicating LED 28 in the following manner: when the power is on the LED driving circuit 26 makes the power ON/OFF indicating LED 28 blink in the color in which it is lit when the power is on; when the power is off, the LED driving circuit 26 makes the power ON/OFF indicating LED 28 blink in the color in which it is lit when the power is off.

Figure 2:
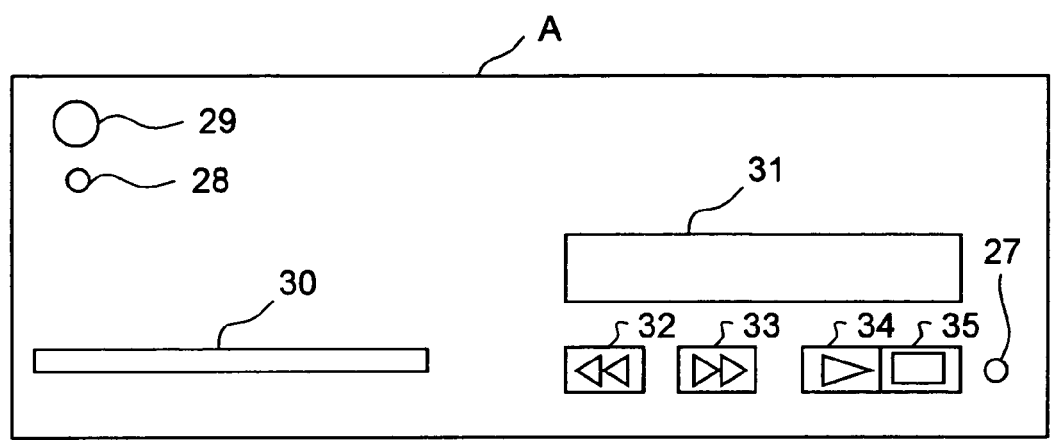
FIG. 2 is a front view showing, in a simplified manner, the operation panel of the optical disc reproducing apparatus.

FIG. 2 is a front view showing, in a simplified manner, the operation panel of the optical disc reproducing apparatus. In FIG. 2, the operation panel A is provided with: a power key 29 with which to turn on or off the power; the power ON/OFF indicating LED 28 that is lit, for example, in green when the power is on and is lit, for example, in red in a standby state when the power is off; and the resume-indicating LED 27 that is lit when a resume-on indication on the screen of the display device 20 (see FIG. 1) goes out. The operation panel A is further provided with: a tray 30 on which the optical disc 1 is placed when inserted into and ejected out of the optical disc reproducing apparatus; a display portion 31 that displays the title, the playing time, and the like of the optical disc 1; a skip-down key 32; a skip-up key 33; the play key 34; and the stop key 35.

Figure 3:
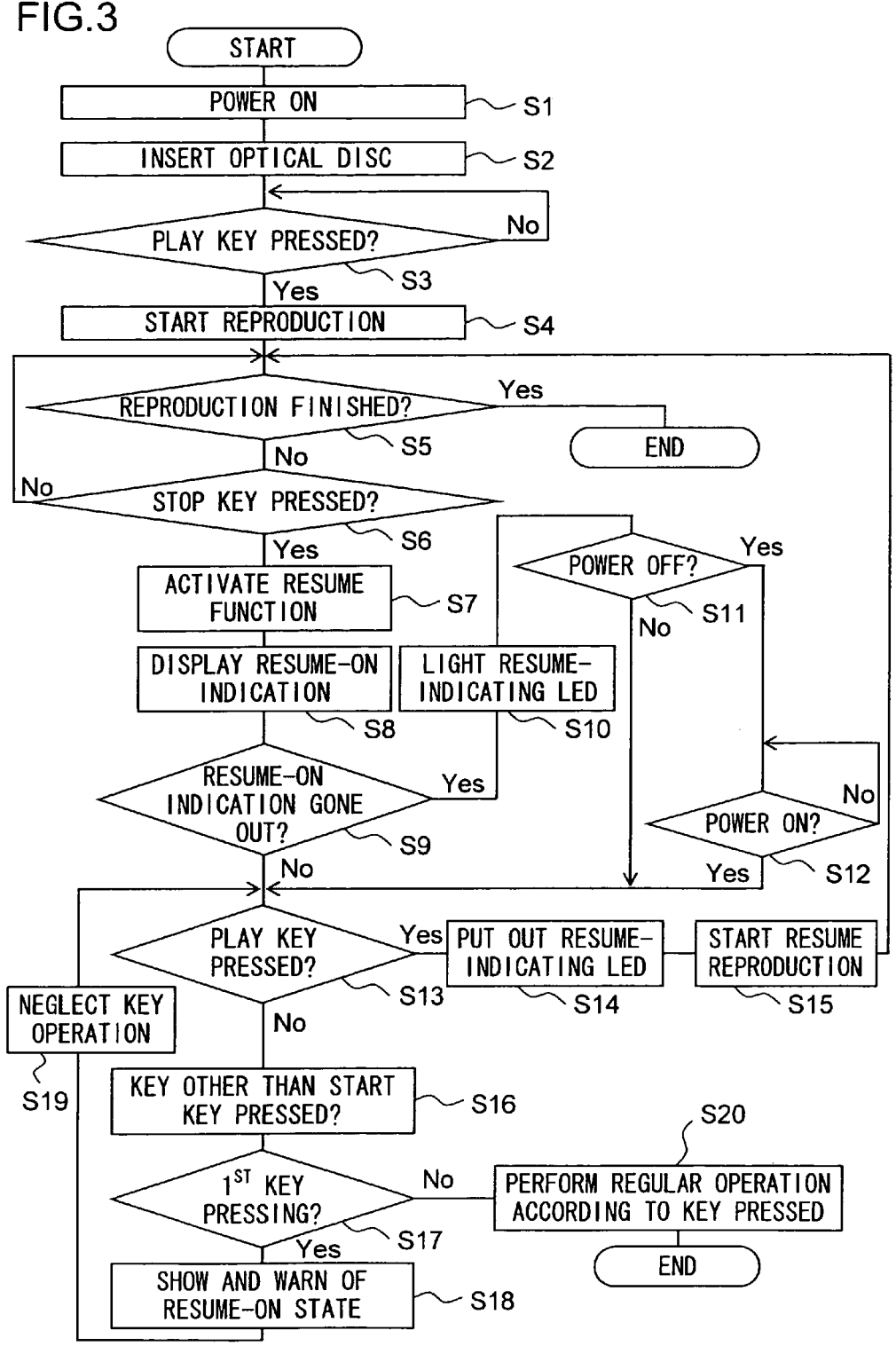
FIG. 3 is a flow chart illustrating the operations performed by the optical disc reproducing apparatus in connection with the resume function thereof.

Hereinafter, the operations related to the resume function will be described with reference to the flow chart shown in FIG. 3 as well as FIGS. 1 and 2.

First, the power is turned on either by pressing a power key 21c on a remote control 21 or by pressing the power key 29 on the operation panel A (Step S1). A tray-opening/closing key (not shown) on the remote control 21 is pressed to open the tray 30, and thereon the optical disc 1 is placed. The tray 30 is closed by pressing the tray-opening/closing key again, and thus the optical disc 1 is inserted into the optical disc reproducing apparatus (Step S2). Reproduction of the information recorded on the optical disc 1 is started either by pressing a play key 21a on the remote control 21 or by pressing the play key 34 on the operation panel A (Step S4).

After reproduction is started, it is monitored whether the reproduction is finished or not (Step S5). If not, that is, during the reproduction, if either a stop key 21b on the remote control 21 or the stop key 35 on the operation panel A is pressed, the pressing is detected by the stop key pressing detecting means 221 (Step S6). This causes the resume function activating means 222 to activate the resume function of the optical disc reproducing apparatus (Step S7). The resume-on indicating means 223 makes the display device 20 display on its screen a resume-on sign to indicate that a resume-on state is established (Step S8).

The resume-on indication checking means 224 checks whether or not the resume-on sign has gone out a predetermined time thereafter (Step S9). If the resume-on indication has gone out, the light-emitting-device lighting means 225 makes the LED driving circuit 26 light the resume-indicating LED 27 (Step S110).

Then, whether the power is off or not is judged (Step S11). The power is on if, in Step S11, the power is found not to be off, or, in Step S11, after the lapse of a predetermined time, the power is turned off for power saving, but then a power-on state is restored either by pressing the play key 21a on the remote control 21 or by pressing the power key 29 on the operation panel A. At this point, to perform resume reproduction, the play key 21 of the remote control 21 or the play key 34 of the operation panel A is pressed (Step S13). Then, the resume-indicating LED 27 goes off (Step S14), and resume reproduction is started (Step S15).

When, in Step S10, the resume-indicating LED 27 is lit and then, in Step S11, the power is found to be on, or when, in Step S11, after the lapse of a predetermined time, the power is once turned off for power saving, but then the play key 21a of the remote control 21 or the power key 29 of the operation panel A is pressed so as to restore a power-on state (Step S12), or when the resume-on sign has not gone out (Step S9), a key other than the start key may be pressed (S16). When this happens, the key-press counting means of the system controller 22 checks whether the key other than the start key is pressed for a first time or not (Step S17).

If the key other than the start key is pressed for a first time, the key operation neglecting means 227 makes the display device 20 indicate and warn that the current state is a state in which the resume function is activated (Step S18). Simultaneously, the key operation neglecting means 227 neglects this first pressing of the key (Step S19). Hence, pressing a key other than the start key for the first time does not cause the optical disc reproducing apparatus to start any operation. If a key other than the start key is pressed for the second or later time, the regular key operation means 228 makes the optical disc reproducing apparatus perform a regular operation according to the key pressed (Step S20).

Figure 4:
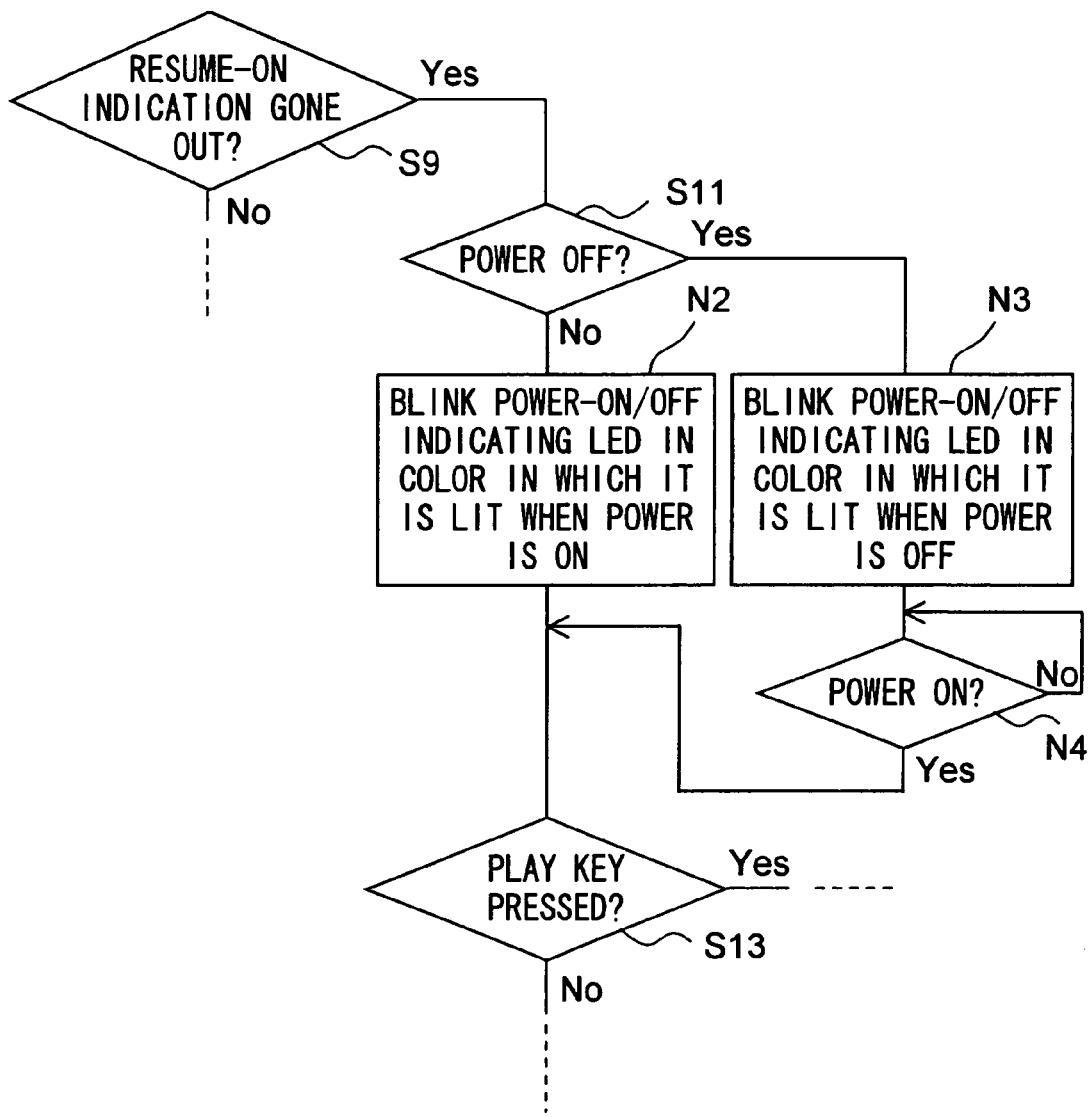
FIG. 4 is a flow chart illustrating the operations performed by the optical disc reproducing apparatus to switch the lighting condition of the resume-indicating light-emitting device when it is realized with the power ON/OFF indicating LED.

As the resume-indicating light-emitting device, the power ON/OFF indicating LED 28 may be used. The operations performed in this case will be described with reference to the flow chart shown in FIG. 4 as well as FIGS. 1 and 2. In FIG. 4, such steps as are found also in the flow chart FIG. 3 are identified with common step numerals.

If, in Step S9, the resume-on sign has gone out on the screen of the display device 20, and then, in Step S11, the predetermined time has not passed and thus the power is on, the light-emitting-device lighting means 229 of the system controller 22 operates the LED driving circuit 26 so as to blink the power ON/OFF indicating LED 28 in the color in which it is lit when the power is on (for example, in green) (Step N2); then in Step S13, it is judged whether the start key has been pressed or not.

If, in Step S9, the resume-on sign has gone out on the screen of the display device 20, and then, in Step S1, the predetermined time has passed and thus the power is off the light-emitting-device lighting means 229 of the system controller 22 operates the LED driving circuit 26 so as to blink the power ON/OFF indicating LED 28 in the color in which it is lit when the power is off (for example, in red) (Step N3). Then, in Step N4, it is monitored whether or not the power key of the remote control 21*c* or the power key 29 of the operation panel A is pressed. If one of the power keys is pressed, then in Step S13, it is judged whether the start key has been pressed or not.

As discussed above, according to this embodiment, even if a resume-on sign has gone out, by lighting the resume-indicating LED 27 or by blinking the power ON/OFF indicating LED 28, it can be clearly indicated whether a resume-on state is currently established or not. This helps avoid a situation where, as a result of the optical disc reproducing apparatus being left in a resume-on state, whether or not the current state is a resume-on state is unclear. Also, in starting resume reproduction, even if the user presses a key other than the play key, or if a person other than the user unknowingly presses a key other than the play key, a warning indication appears to make him or her aware of the mistake. Pressing a key other than the play key for a first time is neglected and the resume-on state is not cancelled, and this makes it possible to make effective use of the resume function.

What is claimed is:

1. An optical disc reproducing apparatus having a resume function that allows, when reproduction is suspended and then restarted, reproduction from immediately after a reproduction position on an optical disc where reproduction has previously been suspended, wherein a system controller of the optical disc reproducing apparatus controls such that:

when the resume function is activated and a resume-on state is established, the system controller makes a display device indicate so by displaying a resume-on sign;

when the resume-on sign goes out a predetermined time thereafter, the system controller turns on a resume-indicating light-emitting device; and when a key other than a play key is pressed while the resume-on sign is displayed, if pressing of the key is a first pressing, the system controller neglects the first pressing.

2. The optical disc reproducing apparatus of claim 1, wherein the system controller thereof comprises:

stop key pressing detecting means for detecting whether or not a stop key is pressed during reproduction of information on the optical disc;

resume function activating means for activating the resume function to establish the resume-on state when the stop key pressing detecting means detects that the stop key is pressed;

resume-on indicating means for making the display device display a resume-on sign when the resume-on state is established so as to indicate that the resume-on state is established;

resume-on indication checking means for checking whether or not the resume-on sign has gone out a predetermined time thereafter;

light-emitting-device lighting means for turning on a resume-indicating light-emitting device when the resume-on indication checking means finds the resume-on sign to have gone out;

key-press counting means for checking whether a key other than the play key, when pressed while the resume-on sign is displayed or the resume-indicating light-emitting device is on, is pressed for a first time or for a second or later time;

key operation neglecting means for making the display device indicate and warn that the resume-on state is established and for neglecting pressing of a key other than the play key if the key is pressed for a first time; and regular key operation means for permitting, if a key other than the play key is pressed for a second or later time, a regular operation according to the key pressed.

3. The optical disc reproducing apparatus of claim 2, wherein the system controller is configured such that, when a power ON/OFF indicating light-emitting device of the optical disc reproducing apparatus is used as the resume-indicating light-emitting device, the system controller uses, as the light-emitting-device lighting means, light-emitting-device blinking means for blinking the power ON/OFF indicating light-emitting device such that:

when power is on, the power ON/OFF indicating light-emitting device blinks in a color in which the power ON/OFF indicating light-emitting device is lit when power is on; and when power is off, the power ON/OFF indicating light-emitting device blinks in a color in which the power ON/OFF indicating light-emitting device is lit when power is off.

4. An optical disc reproducing apparatus having a resume function that allows, when reproduction is suspended and then restarted, reproduction from immediately after a reproduction position on an optical disc where reproduction has previously been suspended, wherein a system controller of the optical disc reproducing apparatus controls such that:

when the resume function is activated and a resume-on state is established, the system controller makes a display device indicate so by displaying a resume-on sign;

a predetermined time thereafter, the system controller turns off the resume-on sign, and in turn, uses a power ON/OFF light-emitting device for indicating a power on/off state of the optical disc reproducing apparatus as a resume-indicating light-emitting device such that:

when power to the optical disc reproducing apparatus is on, the power ON/OFF indicating light-emitting device blinks in a color in which the power ON/OFF indicating light-emitting device is lit when power is on; and when power to the optical disc reproducing apparatus is off, the power ON/OFF indicating light-emitting device blinks in a color in which the power ON/OFF indicating light-emitting device is lit when power is off; and further, when a key other than a play key is pressed while the resume-on sign is displayed or the resume-indicating light-emitting device is on, the system controller neglects pressing of the key if the key is pressed for a first time, and the system controller permits a regular operation according to the key pressed to be performed if the key is pressed for a second or later time.

* * * * *